(12) United States Patent
Lin et al.

(10) Patent No.: US 10,063,403 B2
(45) Date of Patent: Aug. 28, 2018

(54) METHOD OF ADJUSTING MODULATION AND CODING SCHEME

(71) Applicant: MEDIATEK INC., Hsin-Chu (TW)

(72) Inventors: Ying-You Lin, Taoyuan (TW);
Chih-Wei Kang, Taipei (TW);
Chih-Kun Chang, New Taipei (TW);
Shu-Min Cheng, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 95 days.

(21) Appl. No.: 15/270,009

(22) Filed: Sep. 20, 2016

(65) Prior Publication Data

US 2017/0085410 A1 Mar. 23, 2017

Related U.S. Application Data

(60) Provisional application No. 62/222,225, filed on Sep. 23, 2015.

(51) Int. Cl.
*H04L 27/34* (2006.01)
*H04L 29/08* (2006.01)
*H04L 12/801* (2013.01)
*H04L 5/00* (2006.01)
*H04L 1/00* (2006.01)

(52) U.S. Cl.
CPC .......... *H04L 27/3405* (2013.01); *H04L 1/003* (2013.01); *H04L 5/006* (2013.01); *H04L 47/29* (2013.01); *H04L 67/22* (2013.01)

(58) Field of Classification Search
CPC .............. H04W 72/1231; H04W 88/02; H04L 27/2601; H04L 27/3405; H04L 1/0077; H04L 1/20; H04L 1/0003; H04L 1/0009; H04L 25/0226; H04L 47/29; H04L 67/22; H04L 5/006

See application file for complete search history.

(56) References Cited

U.S. PATENT DOCUMENTS

| | | | | |
|---|---|---|---|---|
| 9,648,601 | B2 * | 5/2017 | Wang | H04L 5/0057 |
| 2007/0253442 | A1 * | 11/2007 | Yu | H04L 27/2613 370/464 |
| 2012/0276896 | A1 * | 11/2012 | Ren | H04L 1/0003 455/423 |

* cited by examiner

*Primary Examiner* — Kwang B Yao
*Assistant Examiner* — Ricardo Castaneyra
(74) *Attorney, Agent, or Firm* — Winston Hsu (57) ABSTRACT

A method includes determining statics indicators of a first communication device when communicating with a plurality of communication groups comprising the first communication device and at least one second communication device; generating a plurality of multi-user level statics of a plurality of multi-user levels according to the static indicators corresponding to each multi-user level, wherein each multi-user level comprises communication groups with a given number of communication devices; adjusting a plurality of group offsets of the plurality of communication groups according to the plurality of multi-user level statics and current modulation and coding scheme of the first communication device in the plurality of communication groups; and adjusting initial MCSs of the first communication device and the second communication device in each communication group by the group offset of each communication group, to acquire the current MCSs of the first communication device and the second communication device of each communication group.

9 Claims, 5 Drawing Sheets

| MCS | Decreasing Threshold | Increasing Threshold |
|---|---|---|
| MCS_1 | N/A | 0.31 |
| MCS_2 | 0.5 | 0.21 |
| MCS_3 | 0.33 | 0.16 |
| MCS_4 | 0.25 | 0.21 |
| MCS_5 | 0.33 | 0.16 |
| MCS_6 | 0.25 | 0.07 |
| MCS_7 | 0.11 | 0.06 |
| MCS_8 | 0.10 | 0.10 |
| MCS_9 | 0.17 | 0.06 |
| MCS_10 | 0.10 | N/A |

METHOD OF ADJUSTING MODULATION AND CODING SCHEME

CROSS REFERENCE TO RELATED APPLICATIONS

This application claims the benefit of U.S. Provisional Application No. 62/222,225 filed on Sep. 23, 2015, the contents of which are incorporated herein in their entirety.

BACKGROUND

The present invention relates to a method for a wireless communication system, and more particularly, to a method of adjusting modulation and coding scheme (MCS) in a wireless communication system.

In IEEE 802.11 wireless systems, channel sounding and feedback process is commonly used for channel estimation. In multiple-input and multiple-output (MIMO) systems, each channel sounding and feedback process is followed by a series of MIMO frame exchange. During channel sounding and feedback, a transmitting device (initiator) sends a sounding announcement (e.g., null data packet announcement (NDPA)) followed by a sounding packet (e.g., null data packet (NPD)) to a receiving device (responder) participating in the process. The responder estimates the channel during the preamble portion of the sounding packet. The responder then feedbacks the average signal-to-noise ratio (SNR) and channel state information (CSI) to allow the initiator to compute the transmit antenna weights (precoding) for MIMO transmission. Feedback packet may also include other channel quality metrics such as MCS, BER, SNR/SINR, and mutual information.

Feedback of accurate channel quality information such as SNR and MCS allows the transmitter to make correct decision regarding transmission bandwidth adjustment as well as MCS adaptation to improve system performance. However, the MCS selected according to the feedback channel quality information may be outdated because the channel quality varies with time. The throughput performance of the wireless communication system may be degraded because of the time varying channel quality. Thus, how to adjust the MCS adopted by the wireless communication system becomes a topic to be discussed.

SUMMARY

In order to solve the above problems, the present invention provides a method of adjusting modulation and coding scheme (MCS) in a wireless communication system.

The present invention discloses a method for a wireless communication system. The method comprises determining a plurality of statics indicators of a first communication device when communicating with a plurality of communication groups comprising the first communication device and at least one second communication device of the wireless communication system; generating a plurality of multi-user level statics of a plurality of multi-user levels according to the static indicators corresponding to each of the plurality of multi-user levels, wherein each of the plurality of multi-user levels comprises communication groups with a given number of communication devices; adjusting a plurality of group offsets of the plurality of communication groups according to the plurality of multi-user level statics and current modulation and coding schemes (MCSs) of the first communication device in the plurality of communication groups; and adjusting initial MCSs of the first communication device and the at least one second communication device in each of the communication groups by the group offset of each of the communication groups, to acquire the current MCSs of the first communication device and the at least one second communication device of each of the communication groups; wherein the initial MCSs of the first communication device and the at least one second communication device in each of the communication groups are determined by a sounding process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
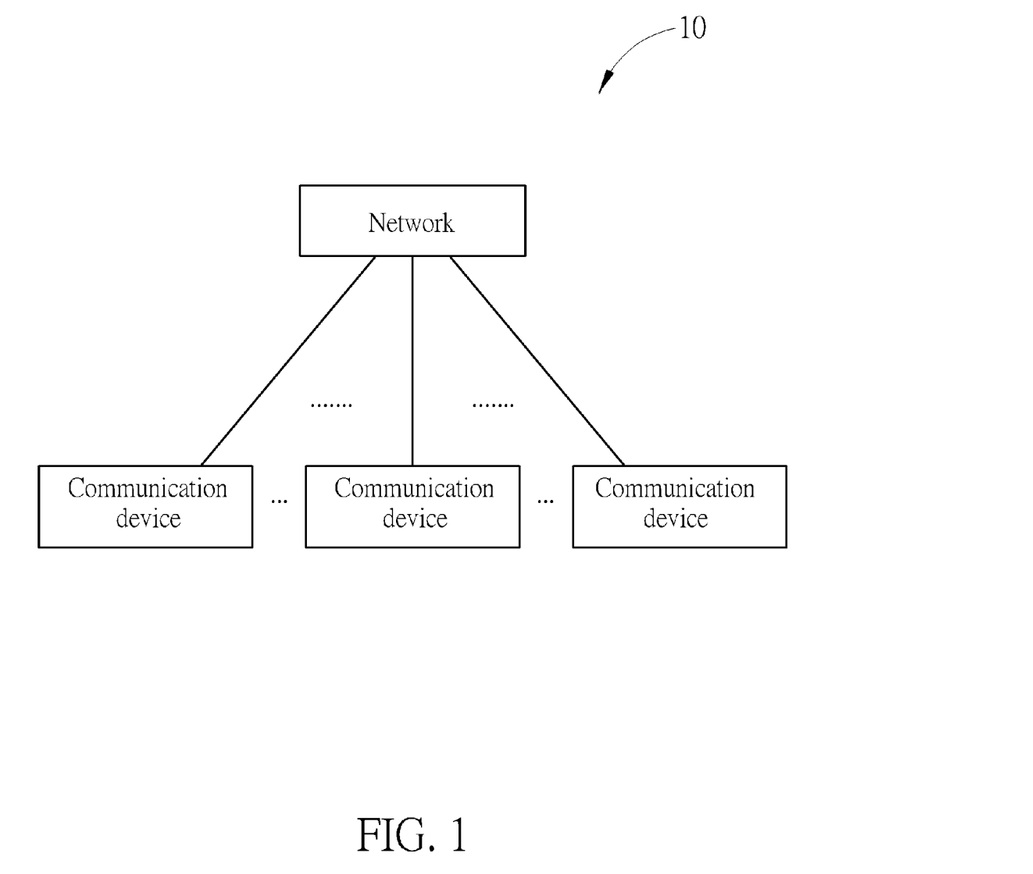
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system. In still another example, the network may be a Wi-Fi system using an access point (AP).

The network may be equipped with multiple antennas for perform a beamforming operation, to realize massive multiple-input multiple-output (MIMO) or time-reversal division multiple access (TRDMA). That is, beam sectors maybe formed by the antennas according to the massive MIMO or the TRDMA. Energy of the signals (e.g., received signals and/or transmitted signals) may be separated and focused within corresponding beam sectors. The communication devices may be divided into multiple groups of communication devices, and each group of communication devices belongs to a corresponding one of the beam sectors. Thus, advantage of spatial focusing effect may be provided to the communication devices, when the massive MIMO or the TRDMA is operated. It should be noted that complexity of a communication device may be further reduced if the network performs a transmission to the communication device according to the TRDMA. For example, the communication device may need only one receive antenna to perform a reception from the network according to the TRDMA. According to the above description, multiple-user MIMO (MU-MIMO) is realized between the network and the communication devices shown in FIG. 1.

Figure 2:
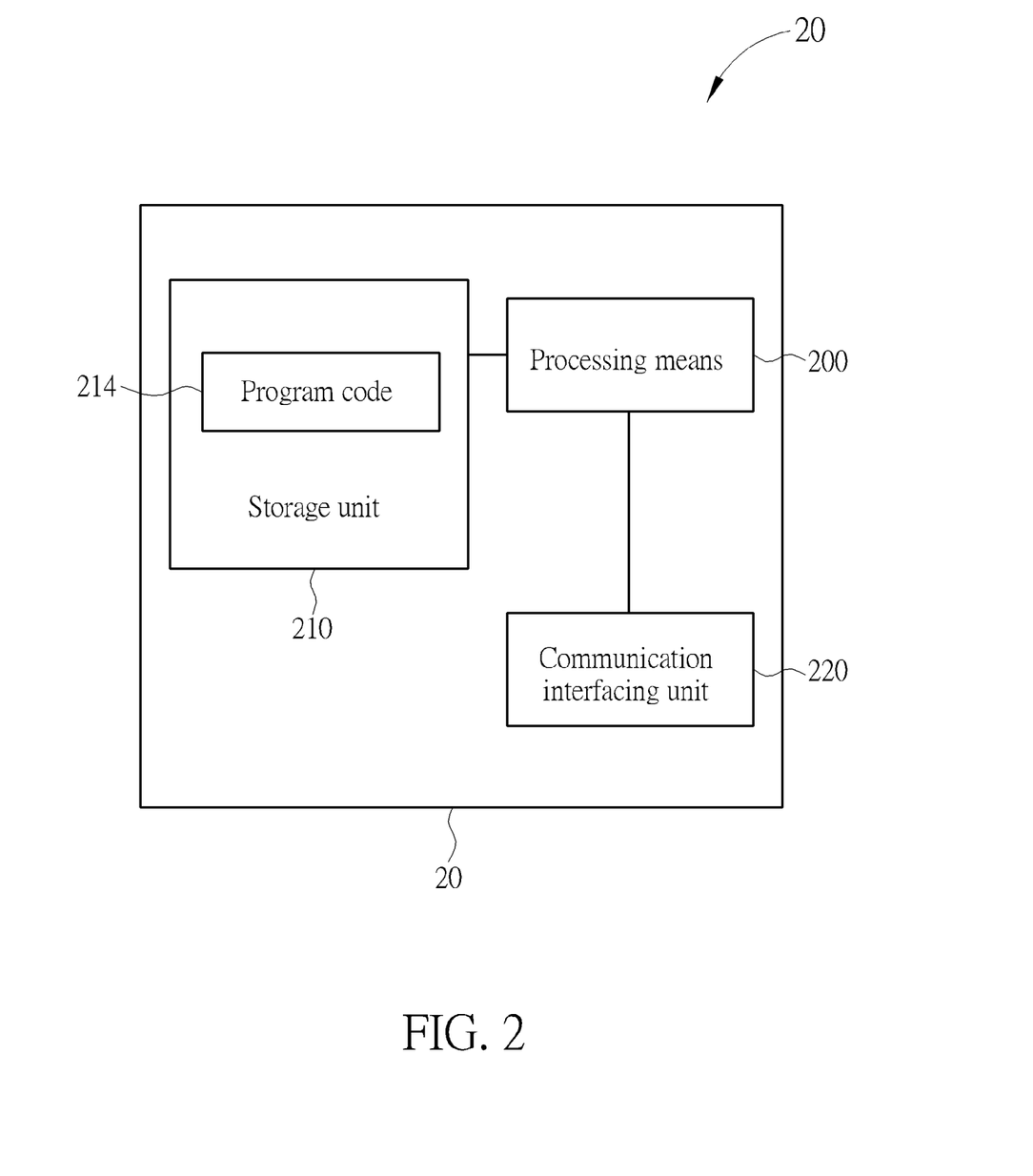
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
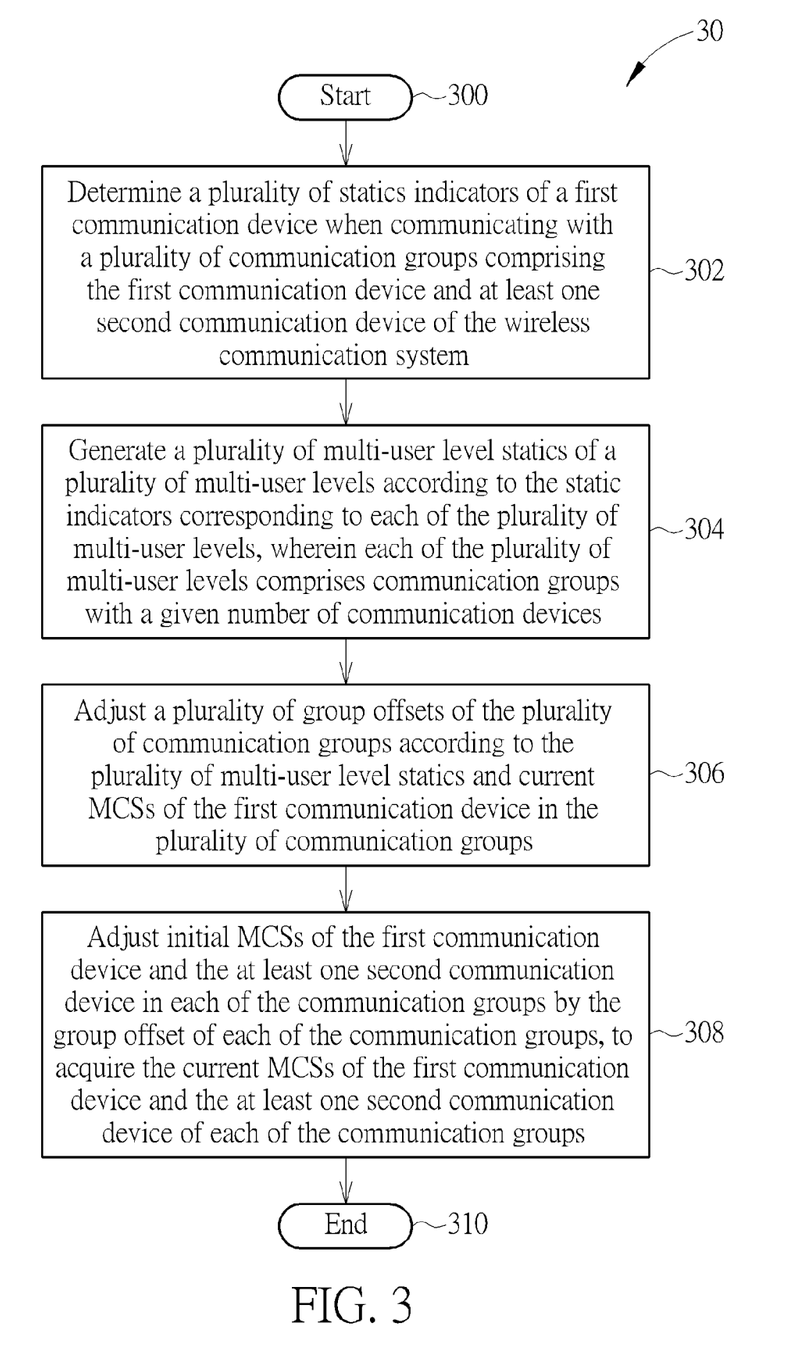
FIG. 3 is a flowchart of a process according to an example of the present invention.

Please refer to FIG. 3, which is a flowchart of a process 30 according to an example of the present invention. The process 30 may be utilized in a network of a wireless communication system for adjusting modulation and coding schemes (MCSs) of communicating with the communication devices in the wireless communication system. The process 30 may be compiled into the program code 214 and includes the following steps:

Step 300: Start.

Step 302: Determine a plurality of statics indicators of a first communication device when communicating with a plurality of communication groups comprising the first communication device and at least one second communication device of the wireless communication system.

Step 304: Generate a plurality of multi-user level statics of a plurality of multi-user levels according to the static indicators corresponding to each of the plurality of multi-user levels, wherein each of the plurality of multi-user levels comprises communication groups with a given number of communication devices.

Step 306: Adjust a plurality of group offsets of the plurality of communication groups according to the plurality of multi-user level statics and current MCSs of the first communication device in the plurality of communication groups.

Step 308: Adjust initial MCSs of the first communication device and the at least one second communication device in each of the communication groups by the group offset of each of the communication groups, to acquire the current MCSs of the first communication device and the at least one second communication device of each of the communication groups.

Step 308: End.

According to the process 30, the network determines (e.g. collects or records) a plurality of static indicators of a first communication device when communicating with a plurality of communication groups, wherein each of the communication groups comprises the first communication device and at least one second communication device of the wireless communication system. That is, the network determines the static indicator of the first communication device when simultaneously communicating with the communication devices (i.e. the first communication device and at least one second communication device) in each of the plurality of communication groups. In an example, the static indicators maybe be packet error rates (PERs) of the first communication device when the network respectively communicates with the communication groups. The PERs may be periodically measured (e.g. every 100 ms or 200 ms) or sampled by the number of packets transmitted by the network.

In this example, the communication groups are classified into a plurality of multi-user levels MUL_2-MUL_n according to a number of communication devices in each of the communication groups, wherein the number n is determined by the number of communication device capable of communicating with the network simultaneously. The communication groups comprising the first communication device and 1 second communication device (i.e. 2 communication devices) are classified into the multi-user level MUL 2, the communication groups comprising the first communication device and 2 second communication devices (i.e. 3 communication devices) are classified into the multi-user level MUL_3, and so on. After acquiring the static indicator of the first communication device in each of the communication groups, the network generates statics (e.g. averages, medians, or modes) of the static indicators corresponding to the multi-user levels to acquire a plurality of multi-user level static MULS_2-MULS_n of the multi-user levels MUL_2-MUL_n. That is, the network calculates the static of the statics indicators corresponding to the communication groups with the same number of communication devices to acquire the multi-user level statics MULS_2-MULS_n.

Next, the network adjusts a plurality of group offsets of the communication groups according to the multi-user level statics MULS_2-MULS_n and current MCSs of the first communication device of the communication groups. The multi-user level static MULS_2 of the multi-user level MUL2 is utilized to adjust the group offsets of the communication groups with 2 communication devices, the multi-user level static MULS_3 of the multi-user level MUL3 is utilized to adjust the group offsets of the communication groups with 3 communication devices, and so on. The method of the network adjusting the group offsets of the communication groups according to the multi-user level statics MULS_2-MULS_n and the current MCSs of the first communication device in the communication groups may be various. In an example, the network generates different increasing thresholds and decreasing thresholds for different current MCSs adopted by the first communication device in the communication group and adjusts the group offset of the communication group by determining whether the corresponded multi-level static is smaller than the increasing threshold or greater than the decreasing threshold of the current MCS of the first communication device in the communication group. For each of the communication groups, the group offset increases when the corresponded multi-user level static is smaller than the increasing threshold of the current MCS of the first communication device and decreases when the corresponding static is greater than the decreasing threshold of the current MCS of the first communication device.

The group offset of each of the communication groups is utilized to generate the current MCSs of the first communication device and the at least one second communication device in each of the communication group. The current MCSs of the first communication device and the at least one second communication device of each of the communication groups is acquired by summing the group offset and each of initial MCSs of the first communication device and the at least one second communication device in each of the communication groups, wherein the initial MCSs of the first communication device and the at least one second communication device in each of the plurality of communication groups are the MCSs determined according to feedback information (e.g. channel state information (CSI)) acquired by sounding processes, periodically. In other words, the current MCSs of all of the communication devices in each of the communication groups are jointly adjusted by the group offset of each of the communication groups. In this example, the network determines the static indicator of the first communication device when communicating with each of the communication groups and adjusts the current MCSs of the first communication device and the at least one second communication device in each of communication groups according to the statics of the static indicators corresponding to the communication groups with the same number of communication devices. Because the current MCSs of the communication devices in each of the communication groups are adjusted by the timely static indicator of the first communication device in each of the communication groups, the MCSs adopted by the network for communicating with the communication devices become more suitable for the real channel quality and the throughput of the network is improved.

Please note that, the period of determining the initial MCSs of the first communication device and the at least one second communication device in each of the communication groups by the feedback information of the sounding process and that of adjusting the group offsets of the communication groups may be different. For example, the period of determining the initial MCSs may be 100 ms and the period of adjusting the initial offsets may be 200 ms, and are not narrated herein.

As to the details of the process 30 please refer to the following example. In this example, the wireless communication system comprises a network and 4 communication devices COM 1-COM 4. The network comprises at least 4 antennas and adopts MU-MIMO to communicate with the communication devices COM 1-COM 4. That is, the network may communicate with a communication group comprising the communication devices COM 1-COM 4, with communication groups comprising three of the communication devices COM 1-COM 4, or with communication groups comprising two of the communication devices COM 1-COM 4 simultaneously. In order to adopt appropriate MCSs for communicating with the communication device COM 1-COM 4, the network performs sounding processes to acquire CSI of the channels between the network and each of the communication devices COM 1-COM 4 and accordingly selects MCSs MCS_1-MCS_10 to be initial MCSs of the communication devices COM 1-COM 4 in each of the communication groups. Note that, the initial MCSs corresponding to the same communication device may change indifferent communication groups. For example, the initial MCS of the communication device COM 1 may be MCS_9 in one communication group and be MCS_10 in another communication group. In an example, data rates of the MCSs MCS_1-MCS_10 are 29.3, 58.5, 87.8, 117, 175.5, 234, 263.3, 292.5, 351, and 390 Mb/s, respectively.

After determining the initial MCSs of the communication devices COM 1-COM 4 in each of the communication groups, the network selects at least one communication group and adopts the initial MCSs of the communication devices in the selected communication groups to communicate with the communication devices COM 1-COM 4. Note that, the communication groups selected by the network may change with time. When performing the communications, the network records PERs (i.e. static indicators) of the communication devices COM 1-COM 4 when communicating with each of the communication groups and accordingly adjusts the group offset of each of the communication groups.

Next, the network utilizes the PERs of the communication device COM 1 (i.e. the first communication device) in each of the communication groups comprising the communication device COM 1 to adjusts the group offset of the communication groups comprising the communication device COM 1. In this example, the communication groups comprising the communication device COM 1 are (COM 1, COM 2), (COM 1, COM 3), (COM 1, COM 4), (COM 1, COM 2, COM 3), (COM 1, COM 2, COM 4), (COM 1, COM 3, COM 4), and (COM 1, COM 2, COM 3, COM 4). The communication groups (COM 1, COM 2), (COM 1, COM 3), and (COM 1, COM 4) are classified into the multi-user level MUL_2, the communication groups (COM 1, COM 2, COM 3), (COM 1, COM 2, COM 4), and (COM 1, COM 3, COM 4) are classified into the multi-user level MUL_3, and the communication group (COM 1, COM 2, COM 3, COM 4) is classified into the multi-user level MUL_4. The network calculates a static (e.g. average) of PERs of the communication device COM 1 in the communication groups of the multi-user level MUL_2 as the multi-user level static MULS_2. That is, the network calculates the static of the PERs of the communication device COM 1 when communicating with the communication groups (COM 1, COM 2), (COM 1, COM 3), or (COM 1, COM 4) as the multi-user level static MULS_2. Similarly, the network calculates a static of PERs of the communication device COM 1 in the communication groups of the multi-user level MUL_3 as a multi-user level static MULS_3 and calculates a static of PER of the communication device COM 1 in the communication groups of the multi-user level MUL_4 as a multi-user level static MULS_4.

After acquiring the multi-user level statics MULS_2-MULS_4 of each of the multi-user levels MUL_2-MUL_4 corresponding to the communication device COM 1, the network adjusts the group offset of each of the communication groups comprising the communication device COM 1 according to the multi-user level statics MULS_2-MULS_4 and the current MCS of the communication device COM 1 in each of the communication groups comprising the communication device COM 1. In this example, all of the group offsets start at 0. Please refer to FIG. 4, which is a schematic diagram of a table 40 according to an example of the present invention, wherein the table 40 shows decreasing thresholds and increasing thresholds of the MCSs MCS_1-MCS_10. Because the MCS MCS_1 is the minimum MCS and the MCS MCS_10 is the Maximum MCS in this example, the MCS MCS_1 does not have decreasing threshold and the MCS_MCS_10 does not have increasing threshold. Based on the table 40 and the current MCS of the communication device COM 1, the network adjusts the group offsets of the communication groups comprising the communication device COM 1 by determining whether the corresponded multi-user level static greater than the decreasing threshold or smaller than the increasing threshold of the current MCS of the communication device COM 1.

Figure 4:
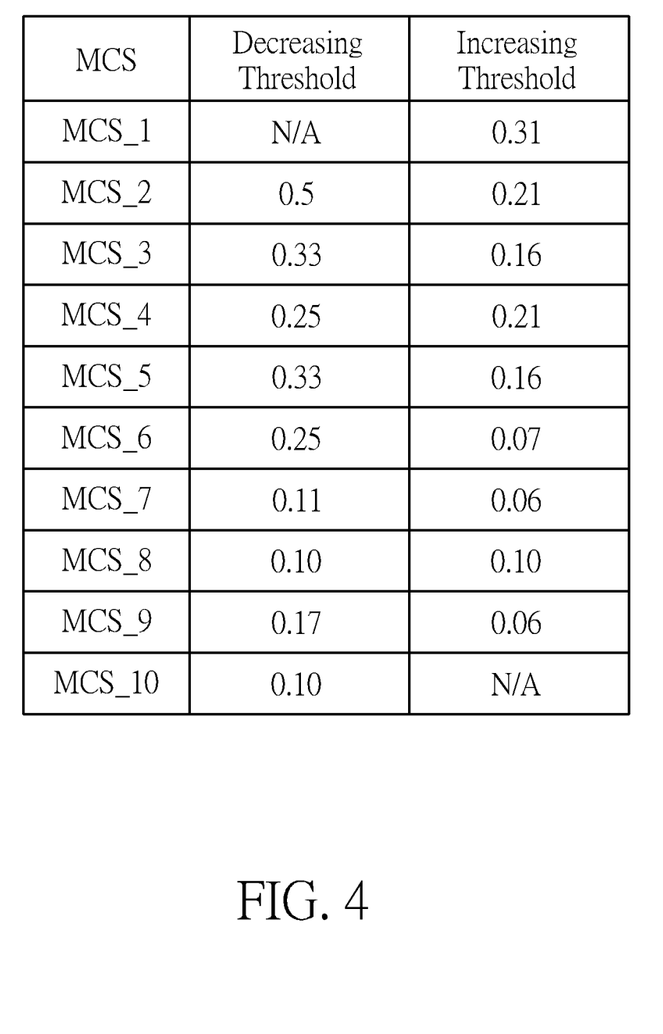
FIG. 4 is a schematic diagram of a table according to an example of the present invention.

In an example, the initial MCSs of the communication devices COM 1 and COM 2 of the communication group (COM 1, COM 2) are MCS_9 and MCS_8, respectively, the group offset of the communication group (COM 1, COM 2) is 0, and the PERs of the communication device COM 1 of the communication groups (COM 1, COM 2), (COM 1, COM 3), and (COM 1, COM 4) (i.e. the multi-user level MUL_2) are 10, 20%, and 30%, respectively. Under such a condition, the network acquires the average 20% of PERs of the communication device COM 1 in multi-user level MUL_2 as the multi-user level static MULS_2. As shown in the table 40, the decreasing threshold and the increasing threshold of the current MCS MCS_9 is 0.17 and 0.06, respectively. Because the multi-user level static MUL_2 is greater than the decreasing threshold, the group offset of the communication group (COM 1, COM 2) is decreased by 1. After adjusting the initial offset of the communication group (COM 1, COM 2), the current MCS of the communication devices COM 1 and COM 2 in the communication group (COM 1, COM 2) becomes MCS_8 and MCS_7, respectively. That is, the current MCS of the communication device COM 2 in the communication group (COM 1, COM 2) is jointly adjusted according to the PERs of the communication device COM 1 in the multi-user level MUL_2. The multi-user level static MULS_2 is also utilized to adjust the group offsets of the communication groups (COM 1, COM 3) and (COM 1, COM 4) in the multi-user level MUL_2. In other words, the network utilizes the static of the PERs of the communication device COM 1 in the multi-user level MUL_2 to adjust the current MCSs of the communication devices in each of the communication groups of the multi-user level MUL_2. Similarly, the network utilizes the multi-user level statics MULS_3 and MULS_4 to adjust the current MCSs of the communication devices in each of the communication groups of the multi-user levels MUL_3 and MUL_4, respectively. Further, the network utilizes the PERs of the communication devices COM 2-COM 4 in the communication groups to adjust the group offsets of the communication groups. As a result, the MCSs adopted by the network for communicating with the communication devices COM 1-COM 4 become more suitable for the time varying channel quality and the throughput of the wireless communication system is improved.

According to different applications and designed concepts, those with ordinary skill in the art may observe appropriate alternations and modifications. In an example, the network utilizes the multi-user level statics to adjust multi-user level offsets of the multi-user levels, wherein the multi-user level offset of each of the multi-user levels is utilized to adjust the MCSs of communication devices in the communication groups of each of the multi-user levels. In another example, the network calculates an overall static of the static indicators of the first communication device in all of the communication groups and accordingly adjusts the group offset of each of the communication groups and the current MCS of the first communication device in each of the communication groups. Instill another example, the network adjusts the group offset of each of the communication groups according to the static indicator and the current MCS of the first communication device in each of the communication groups.

In an example, a communication group may be disabled when its group offset is smaller than a disabling threshold, wherein the network does not select the disabled communication group to perform the communications. The disabled communication group may be enabled to be selected by the network for performing the communications when the average of MCSs of the communication devices in its sub-groups exceeds an enabling threshold. Note that, the condition of disabling or enabling the communication group may change according to different applications and design concepts. For example, the network may enable the disabled communication group when all of the MCSs of the sub-groups of the disabled communication group exceed the enable threshold.

As to the details of disabling and enabling the communication groups please refer to the following example. In the example, the wireless communication system comprises a network and 4 communication devices COM 1-COM 4. The network comprises at least 4 antennas and adopts MU-MIMO to communicate with the communication devices COM 1 -COM 4. The network performs the process 30 to adjust the current MCSs of the communication groups comprising at least two of the communication devices COM 1-COM 4. During communications, the initial MCS offset of the communication group (COM 1, COM 2, COM 3) is adjusted to −4 and becomes smaller than a disabling threshold −3. Under such a condition, the communication group (COM 1, COM 2, COM 3) is disabled and the network does not select the communication group (COM 1, COM 2, COM 3) to perform the communications (i.e. does not simultaneously communicate with the communication devices COM 1, COM 2, and COM 3). When the communication group (COM 1, COM 2, COM 3) is disabled, the network monitors the MCSs of the communication devices in the sub-groups (COM 1, COM 2), (COM 1, COM 3), and (COM 2, COM 3) of the communication group (COM 1, COM 2, COM 3). When an average of MCSs of the communication devices in the sub-groups (COM 1, COM 2), (COM 1, COM 3), and (COM 2, COM 3) exceeds MCS MCS_7 (i.e. the enabling threshold), the network enables the communication group (COM 1, COM 2, COM 3) and allows the communication group (COM 1, COM 2, COM 3) to be selected for performing the communications.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Figure 5:
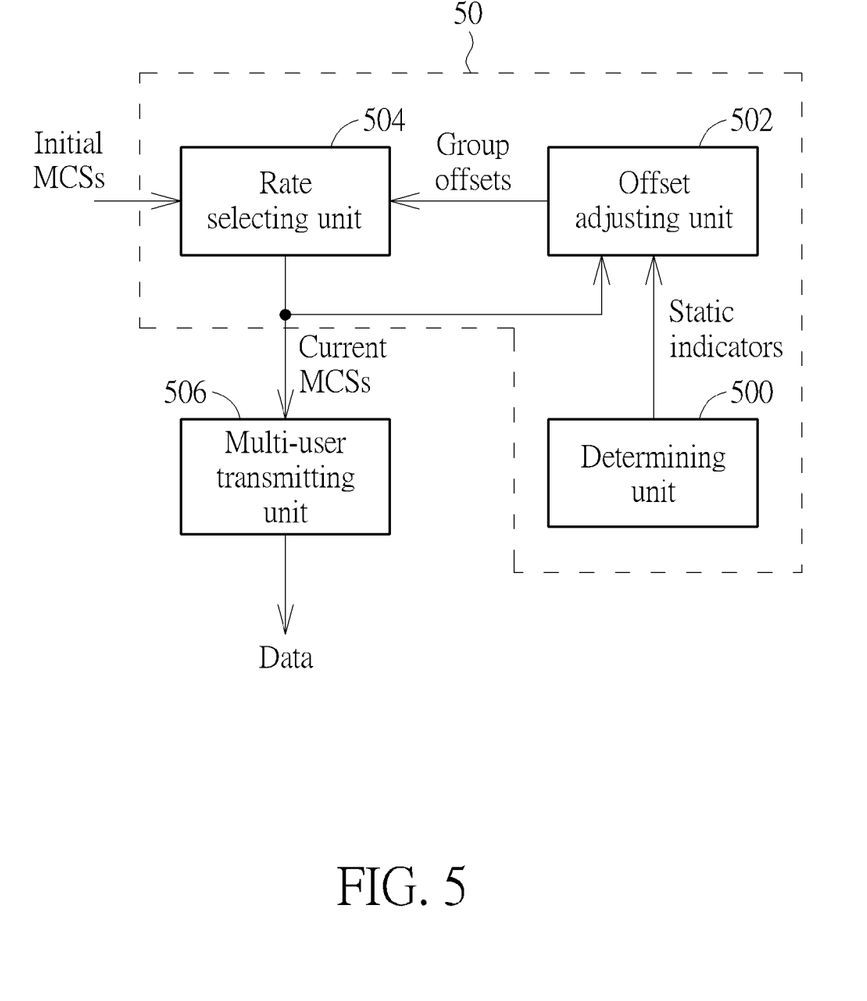
FIG. 5 is a schematic diagram of an initial MCS selecting module according to an example of the present invention.

Please refer to FIG. 5, which is a schematic diagram of an initial MCS selecting module 50 according to an example of the present invention. The MCS selecting module 50 may be realized in a media access control (MAC) layer of a network and is utilized to selecting MCSs of a plurality of communication groups determined by the sounding processes. As shown in FIG. 5, the MCS selecting module 50 comprises a determining unit 500, an offset adjusting unit 502, and a rate selecting unit 504. In FIG. 5, the network comprises a multi-user transmitting unit 506 for communicating with communication groups comprising multiple communication devices. When operating, the network performs the sounding processes to acquire the CSI of the communication devices and accordingly determines initial MCSs of the communication devices in each of the communication groups. After the initial MCSs are determined by the sounding processes, the multi-user transmitting unit 506 transmits data according to the initial MCSs of the communication devices in each of the communication groups and the determining unit 500 records PERs of communication devices on the basis of communication groups. Next, the offset adjusting unit 502 calculates statics of the PERs of the multi-user levels (i.e. the communication groups with the same number of communication devices) as the multi-user level statics and accordingly adjusts the initial MCS offsets of the communication groups. According to the initial MCS offsets generated by the offset adjusting unit 502, the rate selecting unit 504 adjusts the initial MCSs of the communication devices in each of the communication groups by the initial MCS offset of each of the communication groups.

In the above example, the network adjusts the current MCSs of the communication devices in each of the communication group according to the static indicators of the first communication device in each of the communication group. The adopted MCSs adopted become more suitable for the time varying channel quality and the throughput of the wireless communication system is improved, therefore.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a wireless communication system, the method comprising:
   determining a plurality of statics indicators of a first communication device when communicating with a plurality of communication groups comprising the first communication device and at least one second communication device of the wireless communication system;
   generating a plurality of multi-user level statics of a plurality of multi-user levels according to the static indicators corresponding to each of the plurality of multi-user levels, wherein each of the plurality of multi-user levels comprises communication groups with a given number of communication devices;
   adjusting a plurality of group offsets of the plurality of communication groups according to the plurality of multi-user level statics and current modulation and coding schemes (MCSs) of the first communication device in the plurality of communication groups; and
   adjusting initial MCSs of the first communication device and the at least one second communication device in each of the communication groups by the group offset of each of the communication groups, to acquire the current MCSs of the first communication device and the at least one second communication device of each of the communication groups;
   wherein the initial MCSs of the first communication device and the at least one second communication device in each of the communication groups are determined by a sounding process.

2. The method of claim 1, wherein the plurality of static indicators are packet error rates (PERs) of the first communication device when communicating with the plurality of communication groups.

3. The method of claim 1, wherein the step of adjusting the plurality of group offsets of the plurality of communication groups according to the plurality of multi-user level statics of the and current MCSs of the first communication device in the plurality of communication groups comprises:
   increasing a first group offset of a first communication group when the multi-user level static of the first communication group is greater than an increasing threshold of the current MCS of the first communication device of the first communication group.

4. The method of claim 1, wherein the step of adjusting the plurality of group offsets of the plurality of communication groups according to the plurality of multi-user level statics and current MCSs of the first communication device in the plurality of communication groups comprises:
   decreasing a first group offset of a first communication group when the multi-user level static of the first communication group is greater than a decreasing threshold of the current MCS of the first communication device of the first communication group.

5. The method of claim 1, further comprising:
   disabling a first communication group when a first initial offset of the first communication group is smaller than a disabling threshold;
   wherein when the first communication group is disabled the first communication group is not selected to perform communications.

6. The method of claim 5, further comprising:
   enabling the first communication group when a static of the MCSs of at least one of the first communication device and the at least one second communication device in sub-groups of the first communication group is greater than an enabling threshold.

7. The method of claim 1, further comprising:
   calculating an overall static of the plurality indicators of the first communication device in the plurality of the communication groups; and
   adjusting the plurality of group offsets according to the overall static.

8. The method of claim 1, further comprising:
   adjusting a plurality of multi-user level offsets of the plurality of multi-user levels according to the plurality of multi-user level statics; and
   adjusting the initial MCSs of the first communication device and the at least one of the second communication device in each of the plurality communication groups of each of the multi-user levels according to the plurality of multi-user level offsets.

9. The method of claim 1, further comprising:
   adjusting a first group offset of a first communication group according to the static indicator of the first communication device in the first communication group; and
   adjusting the initial MCSs of the first communication device and the at least one second communication device in the first communication group by the first group offset, to acquire the current MCSs of the first communication device and the at least one second communication device in the first communication group.

* * * * *